United States Patent
Thomas

(10) Patent No.: US 9,083,025 B2
(45) Date of Patent: Jul. 14, 2015

(54) FUEL CELL STACKS

(75) Inventor: Martin Thomas, Cranleigh (GB)

(73) Assignee: AFC Energy plc (GB)

( * ) Notice: Subject to any disclaimer, the term of this patent is extended or adjusted under 35 U.S.C. 154(b) by 0 days.

(21) Appl. No.: 13/695,453

(22) PCT Filed: May 9, 2011

(86) PCT No.: PCT/GB2011/050887
§ 371 (c)(1),
(2), (4) Date: Oct. 31, 2012

(87) PCT Pub. No.: WO2011/141727
PCT Pub. Date: Nov. 17, 2011

(65) Prior Publication Data
US 2013/0059222 A1    Mar. 7, 2013

(30) Foreign Application Priority Data

May 11, 2010  (GB) .................................. 1007858.2

(51) Int. Cl.
H01M 8/04    (2006.01)
H01M 8/08    (2006.01)
H01M 8/24    (2006.01)

(52) U.S. Cl.
CPC ................ *H01M 8/08* (2013.01); *H01M 8/083* (2013.01); *H01M 8/2445* (2013.01); *Y02E 60/50* (2013.01)

(58) Field of Classification Search
None
See application file for complete search history.

(56) References Cited

U.S. PATENT DOCUMENTS

| | | | | |
|---|---|---|---|---|
| 4,510,213 A | * | 4/1985 | Schnacke | 429/460 |
| 5,543,240 A | * | 8/1996 | Lee et al. | 429/444 |
| 6,080,290 A | * | 6/2000 | Stuart et al. | 204/269 |
| 2007/0128497 A1 | * | 6/2007 | Nor | 429/38 |
| 2007/0160894 A1 | * | 7/2007 | Park et al. | 429/39 |

FOREIGN PATENT DOCUMENTS

| | | |
|---|---|---|
| EP | 0107396 A1 | 5/1984 |
| JP | 59217958 A | 12/1984 |

(Continued)

OTHER PUBLICATIONS

Austin et al., Cell Stack, WO 2011/039523 A1 Published Apr. 7, 2011, International Filing Date Jul. 21, 2010.*

(Continued)

*Primary Examiner* — Patrick Ryan
*Assistant Examiner* — Jose Colucci Rios
(74) *Attorney, Agent, or Firm* — Tumey L.L.P.

(57) ABSTRACT

A fuel cell stack (10) comprises a plurality of fuel cells each with a chamber (K) for electrolyte with at least one inlet and at least one outlet, and at least one header (30) to supply electrolyte to all the cells in parallel, and means (14) to collect electrolyte that has flowed through the cells. For each cell, the electrolyte outlets (34) feed into an electrolyte flow channel arranged such that in use there is a free surface of electrolyte within the electrolyte flow channel, the electrolyte flow channel being separate from the corresponding electrolyte flow channels for other cells, but such that the free surfaces of all the electrolyte flow channels are at a common pressure. Electrolyte is maintained at a constant depth in this open flow channel by a weir (38), and then flows over the weir to trickle or drip down the outside of the stack. This ensures uniform outlet electrolyte pressure throughout the stack (10) and across the individual cells, and avoids or reduces ionic leakage currents through the electrolyte outlets.

6 Claims, 3 Drawing Sheets

(56) References Cited

FOREIGN PATENT DOCUMENTS

WO      WO 99/12220 A1    3/1999
WO     WO 2008/116248 A1    10/2008

OTHER PUBLICATIONS

International Search Report and Written Opinion for International Application No. PCT/GB2011/050887 dated Sep. 8, 2011.

Written Opinion of the International Searching Authority for International Application No. PCT/GB2011/050887 dated Sep. 8, 2011.
Written Opinion of the International Preliminary Examining Authority for International Application No. PCT/GB2011/050887 dated Apr. 26, 2012.
Notification of Transmittal of International Preliminary Report on Patentability for International Application No. PCT/GB2011/050887 dated Jul. 10, 2012.

\* cited by examiner

US 9,083,025 B2

FUEL CELL STACKS

The present invention relates to liquid electrolyte fuel cells, preferably but not exclusively alkaline fuel cells, and to the arrangement of such fuel cells in stacks.

BACKGROUND TO THE INVENTION

Fuel cells have been identified as a relatively clean and efficient source of electrical power. Alkaline fuel cells are of particular interest because they operate at relatively low temperatures and have a high theoretical efficiency compared to other fuel cell technologies. Acidic fuel cells and fuel cells employing other aqueous electrolytes are also of interest. Such fuel cells operate at a voltage of usually less than one volt (typically 0.5-0.9 V). To achieve higher voltages, fuel cells are typically arranged in stacks. Fuel cells employing a liquid electrolyte typically comprise an electrolyte chamber that is separated from a fuel gas chamber (containing a fuel gas, typically hydrogen) and a further gas chamber (containing an oxidant gas, usually air). The electrolyte chamber is separated from the gas chambers using electrodes that are gas permeable, and carry a catalyst such as platinum. Within a stack of fuel cells the electrolyte may be circulated through the electrolyte chambers from headers or distribution ducts, so that the electrolyte flows through all the cells are in parallel.

A problem with such an arrangement is that there will be some electrical (i.e. ionic) leakage current between one cell and another through the electrolyte in the headers or distribution ducts. This can be minimised by designing the electrolyte flow paths to raise their ionic resistance, but this measure cannot eliminate the ionic leakage currents altogether. Another problem with such fuel cell stacks is to ensure uniformity of pressure and mass flow rates between the cells and within every cell.

DISCUSSION OF THE INVENTION

According to the present invention there is provided a fuel cell stack comprising a plurality of fuel cells each with a chamber for electrolyte with at least one inlet and at least one outlet, and at least one header to supply electrolyte to all the cells in parallel, and means to collect electrolyte that has flowed through the cells, wherein for each cell the or each outlet for electrolyte communicates with an electrolyte flow channel arranged such that in use there is a free surface of electrolyte within the electrolyte flow channel, the electrolyte flow channel being separate from the corresponding electrolyte flow channels for other cells, but such that the free surfaces of all the electrolyte flow channels are at a common pressure. In the following those electrolyte flow channels may be referred to as open channels.

Each such open electrolyte flow channel may include means to break up the flow into droplets. For example the flow may pass over a projecting lip from which the electrolyte falls freely to a collection means, and in that case there may also be a baffle onto which the falling electrolyte impacts, to help break it up. As another alternative the electrolyte may flow through a multiplicity of apertures to emerge as streams of droplets, or through a vibrating nozzle or aperture. Breaking up the electrolyte flow in this way effectively prevents leakage current through the emerging electrolyte. But even without breaking up the electrolyte, if the electrolyte trickles over the surface of the stack it forms a thin layer so there is significant ionic resistance, which helps suppress the leakage current.

Preferably the outlet from each cell communicates with the open electrolyte flow channel at an upper surface of the cell stack, and the open electrolyte flow channel also defines a weir to ensure that, in use, the electrolyte fills the channel to a consistent depth before overflowing. This ensures that the pressures at all the outlets are equal, which helps ensure uniform pressure throughout any one cell, and between all the cells. The open electrolyte flow channel may form the uppermost part of the electrolyte chamber, but preferably the electrolyte chamber communicates via a plurality of outlet channels with the open electrolyte flow channel.

Preferably the electrolyte is fed from the header into the cell through a long narrow flow channel, for example with a cross-sectional area less than 2 mm$^2$, for example 1 mm$^2$, and of length greater than 50 mm, for example between 75 mm and 150 mm, such as 100 mm. And within the electrolyte chamber there are preferably baffles to enhance flow uniformity within the chamber, for example transverse notched baffles to diffuse the electrolyte flow from each inlet.

The fuel cell stack must also be supplied with the fuel gas and the oxidant gas. These may be supplied through header ducts within the stack. As an alternative, where the oxidant gas is air, the air chambers may communicate directly with the surrounding air. For example air may be allowed to enter each a chamber through one or more entry channels communicating with the faces of the stack, for example the side or bottom face. In a preferred embodiment the air is arranged to be at a higher pressure than the electrolyte, that portion of the cell stack provided with the air entry channels being enclosed within a plenum to which air is supplied at an elevated pressure. This avoids the requirement for there to be any air header ducts defined through the plates making up the stack, and so simplifies the structure of the plates.

The invention will now be further and more particularly described, by way of example only, and with reference to the accompanying drawings in which.

Figure 1:
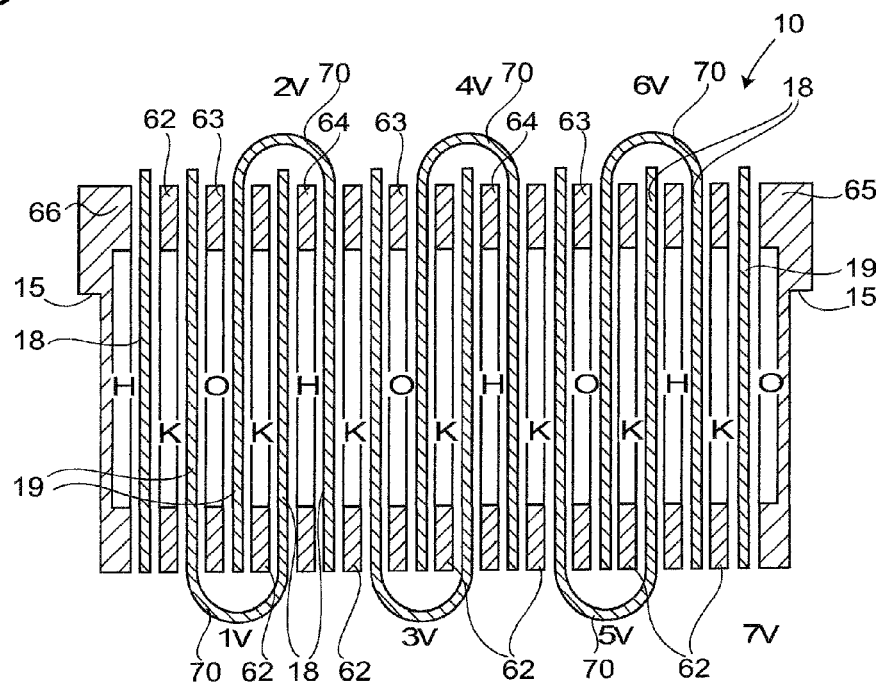
FIG. 1 shows a cross-sectional view perpendicular to the cell plane through a fuel cell stack of the invention.

Referring now to FIG. 1 there is shown a sectional view of a fuel cell stack 10, with the components separated for clarity. The stack 10 consists of a stack of frames 62, 63 and 64, each being of an insulating plastics material, and each defining a rectangular through-aperture. Alternate frames 62 provide electrolyte chambers (marked K), and between successive electrolyte chambers are gas chambers, which are alternately air chambers (marked O) and fuel chambers (marked H). All the chambers are separated from neighbouring chambers by electrode elements 70 with permeable portions adjacent to the electrolyte chambers K, and with impermeable surrounding margins. They are arranged such that the electrode portions in contact with fuel chambers H are anodes 18, while the electrode portions in contact with air chambers O are cathodes 19, each with suitable catalyst materials as described below. As indicated schematically by curved sections, they are electrically connected in pairs, an anode 18 connected to a cathode 19; the pairs may be integral, the anode 18 and cathode 19 being defined at opposite ends of an electrode element 70, or alternatively they may simply be electrically connected, for example by connections between projecting tabs. The electrode elements 70 all project above the frames 62, 63 and 64. It will thus be appreciated that each electrolyte chamber K is between an oxygen chamber O and a fuel chamber H, and is separated from them by a cathode 19 and an anode 18 respectively, these constituting a single fuel cell. Successive fuel cells in the stack are in opposite orientations, but the arrangement of the electrode elements 70 is such that the cells are electrically in series. Taking the EMF of a single fuel cell as 1 V, the voltages of the folded or connected portions of the electrode elements 70 increase steadily along the stack 10 as marked, so that the cell stack 10 of seven cells produces 7 V output.

At the ends of the stack 10 are polar plates 65, 66 that define blind recesses, and there are end electrodes, an anode 18 at one end and a cathode 19 at the other end, which do not form components of a pair. Gaskets (not shown) ensure that the frames 62, 63 and 64 are sealed to the electrode elements 70. The flow of electrolyte to the electrolyte chambers K, and the flow of fuel gas to and from the fuel chambers H, takes place through respective fluid flow ducts defined by aligned apertures 30, 40, 42 (shown in FIGS. 3 and 4) through the frames 62, 63 and 64. The components of the cell stack 10 are secured together after assembly by bolts through aligned apertures 44 (shown in FIGS. 3 and 4).

The anodes 18 and the cathodes 19 have a catalyst coating which may be on the surface facing the respective gas chamber H or O, or on the opposite surface. The catalyst coatings for both cathode and anode electrodes may use a combination of catalyst particles and a binder. For example the coating on the cathodes 19 might comprise 10% Pd/Pt or silver on activated carbon, while the coating on the anodes 18 might comprise 10% Pd/Pt on activated carbon, in each case with 10% binder.

Figure 2:
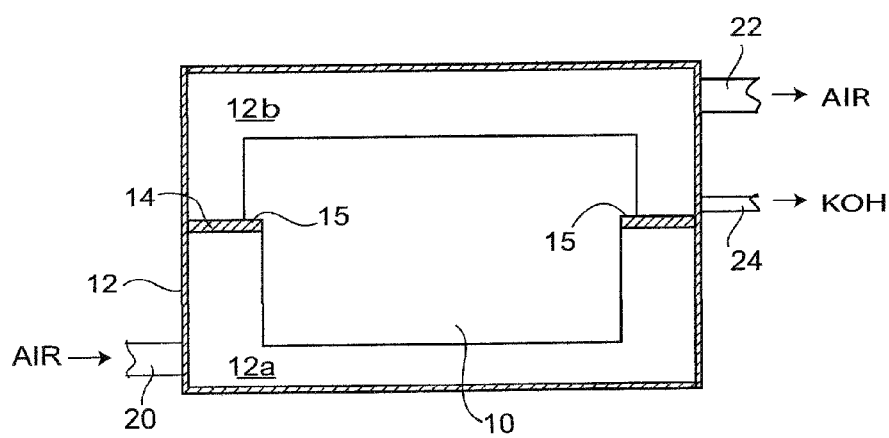
FIG. 2 shows a cross-sectional view parallel to the cell plane of a container enclosing the fuel cell stack of FIG. 1.

Referring now to FIG. 2, in which the structural details within the cell stack are not shown, the cell stack 10 is mounted within a container 12 which defines a horizontal shelf 14 around its periphery which divides it into a lower part 12a and an upper part 12b. The frames 62, 63, 64 that make up the cell stack 10 have a step 15 on each side, as do the end plates 65 and 66, so that the lower part is slightly narrower than the top part. The lower part of the cell stack 10 fits in a rectangular space defined by the shelf 14, and the upper part of the cell stack 10 is sealed to the shelf 14 around its periphery. Air is supplied from a pump (not shown) through a duct 20 into the lower part 12a, to flow through the air chambers O and to emerge into the upper part 12b, from which it is released through an exhaust duct 22. The liquid electrolyte is supplied to one end of the stack 10, and (as explained below) after flowing through the electrolyte chambers K collects on the top of the shelf 14 to flow out through an outlet duct 24. The fuel gas (hydrogen) is also supplied to one end of the stack 10, and the return duct is also connected to that end of the stack 10.

Figure 3:
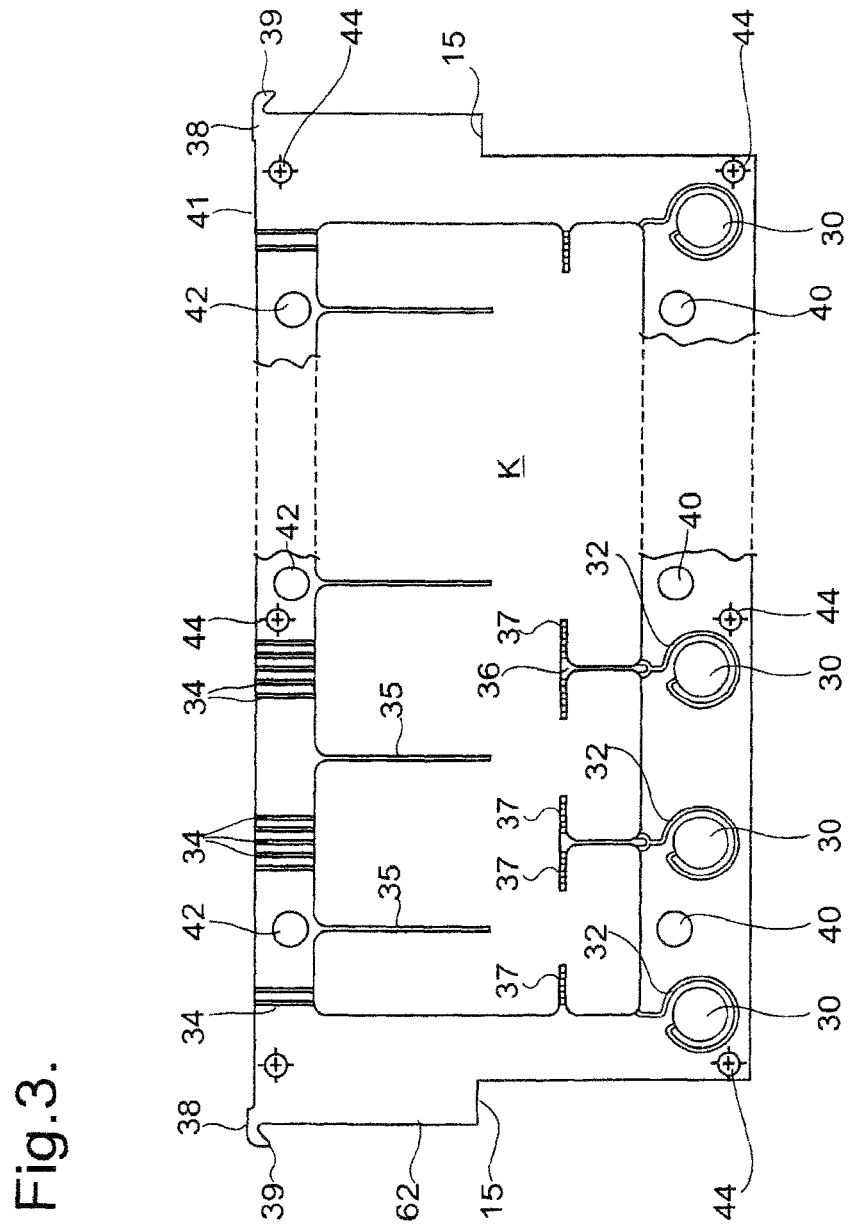
FIG. 3 shows a plan view of an electrolyte plate of the fuel cell stack of FIG. 1.

Referring now to FIG. 3, there is shown a plan view of a frame 62 that defines an electrolyte chamber K. In this example electrolyte is supplied to all the electrolyte chambers K in the stack 10 through distribution ducts defined by aligned apertures 30 that are equally spaced across the width of the electrolyte chamber K. Each aperture 30 communicates through a long narrow groove 32 with the edge of the electrolyte chamber K; the grooves 32 at each corner are slightly narrower. The electrolyte emerges from the chamber K at the top through several parallel grooves 34 that lead to the top edge of the frame 62.

Within the electrolyte chamber K the frame 62 also defines baffles: there are baffles 35 that extend orthogonal to the top edge of the chamber K for slightly more than half the height of the chamber, constraining the electrolyte to flow upwardly towards the exit grooves 34; and there are also T-shaped baffles 36 with notched crosspieces 37 at about a quarter of the height of the chamber up from the bottom edge, and at each side a corresponding crosspiece 37 projecting from the side wall. The grooves 32, apart from those at the corners of the frame 62, each bifurcates to two outlets, one on each side of a baffle 36. The inlets from the grooves 32 are consequently substantially opposite the location of the outlet grooves 34. This arrangement of baffles 35, 36, 37 provides a substantially uniform electrolyte flow throughout the chamber K; during operation it significantly reduces the temperature variations within the cell, the temperature variations being reduced in one experiment from about 17° C. (without the baffles) to about 3° C. (with the baffles), of which about 2.5° C., on average, is the inevitable temperature increase due to the internal resistance of the fuel cell.

At the top of the frame 62, at each end is a raised portion 38 and a curved lip 39 that projects beyond the side of the frame 62. In use of the cell stack 10 electrolyte flows through the electrolyte chamber K from all the distribution ducts defined by the apertures 30, and emerges through all of the grooves 34. The raised portions 38 at each end act as weirs, so that the electrolyte level fills up to just above the top of each raised portion 38, in the open-topped channel that is defined between the adjacent electrode elements 70, which as mentioned above both project above the top of the frame 62. Consequently there is a constant depth of about 2-3 mm of electrolyte above the top of the frame 62 with a free surface of electrolyte exposed to the air pressure within the upper part 12b of the container 12, and the electrolyte then flows continuously over the raised portions 38 and over the lips 39. The electrolyte may then trickle down on the outside of the frame 62 as a thin stream, or fall freely, possibly forming drops, to collect on top of the shelf 14. The raised portions of the electrode elements 70 ensure that the streams of electrolyte from different cells do not meet until the electrolyte reaches the shelf 14

Figure 4:
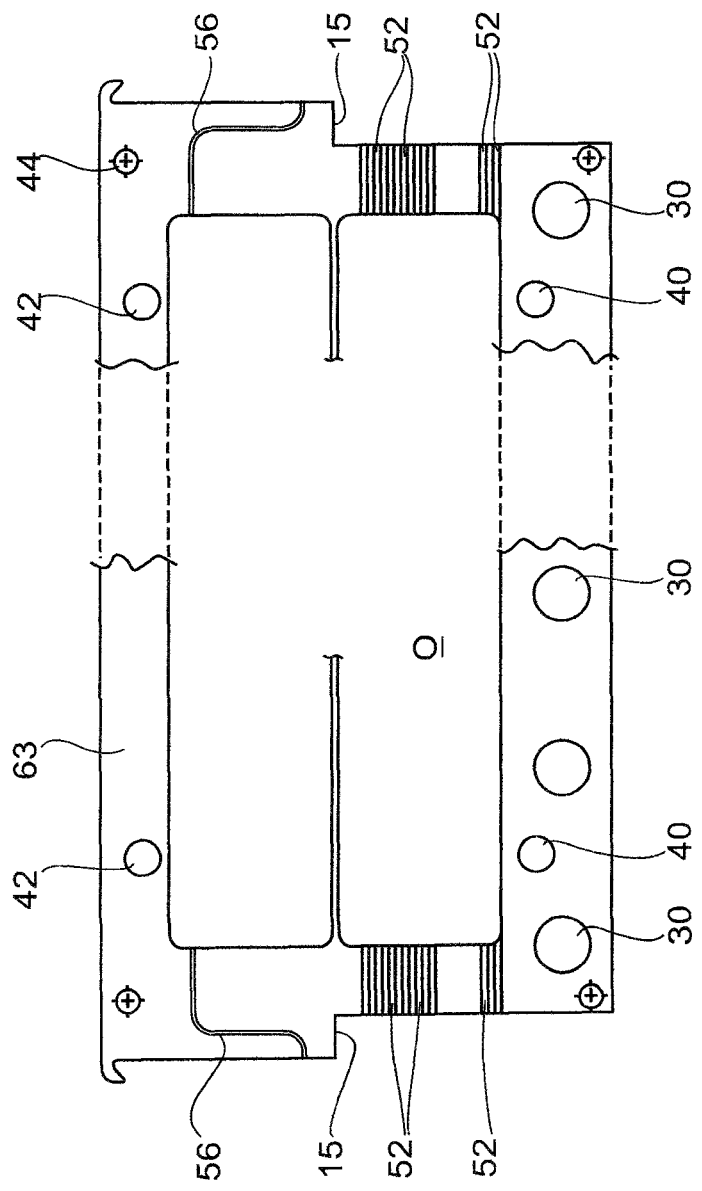
FIG. 4 shows a plan view of an air plate of the fuel cell stack of FIG. 1.

Referring now to FIG. 4 there is shown a plan view of a frame 63 that defines an air chamber O. The lower part 12a of the container 12 acts as a plenum, and enables air to be supplied directly to each air chamber O through the respective frame 63, rather than being supplied through a distribution channel in the stack.

The lower half of the frame 63 defines several grooves 52 on each side which communicate with the lower half of the chamber O. The frame 63 also defines baffles 54 projecting from the midpoints of opposite sides of the chamber O about a third of the way to the opposite side. The multiple inlet grooves 52 ensure that the pressure within the chamber O is only slightly less than the pressure within the lower part 12a of the container 12. The air flows through the chamber O, to emerge via narrow S-shaped grooves 56 which communicate to near the top corners of the chamber O, so the air flows out into the top part 12b of the container 12. For example in the left-hand side of the frame 63 there are eight inlet grooves 52, while there is just one outlet groove 56 of between two and three times the length and of smaller cross-sectional area. In one example the air flow rate was approximately 3 liters/min to each air chamber.

It will be appreciated that the cell stack described above is by way of example only, and may be modified in various ways. The frames 62 and 63, and also the chambers K, O and H may have a different shape to that shown here; and the outlet from the electrolyte chamber K may be through one or more wide grooves or slots in place of the several narrow grooves 34. In one modification the electrolyte chamber K may be filled with a porous material or a mesh which acts as a wick.

What is claimed:
1. A fuel cell stack comprising a plurality of fuel cells each with a chamber for electrolyte with at least one inlet and at least one outlet, and at least one header to supply electrolyte to all the cells in parallel, and means to collect electrolyte that has flowed through the cells, each electrolyte chamber being defined by a frame, and being between an oxidant gas chamber and a fuel gas chamber and separated from them by a cathode electrode and an anode electrode respectively, to constitute a fuel cell, wherein for each cell the or each outlet for electrolyte communicates with an electrolyte flow channel of the fuel cell, so all electrolyte that has flowed through the electrolyte chamber of the fuel cell then flows along the electrolyte flow channel of the fuel cell, the electrolyte flow channel being above the frame defining the electrolyte chamber, the electrolyte flow channel extending in a plane of the frame defining the electrolyte chamber and being arranged such that in use the flow of electrolyte in the electrolyte flow channel is parallel to the plane of the frame and that there is a free surface of electrolyte within the electrolyte flow channel, the electrolyte flow channel being separate from the corresponding electrolyte flow channels for other cells, but such that the free surfaces of all the electrolyte flow channels are at a common pressure, and each electrolyte flow channel communicating, via a projecting lip, with a collection chamber below the electrolyte flow channel, such that the electrolyte from all the electrolyte flow channels falls freely from the projecting lip into the collection chamber.

2. A fuel cell stack as claimed in claim 1 wherein the outlet from each cell communicates with the said electrolyte flow channel at an upper surface of the cell stack, and the said electrolyte flow channel also defines a weir to ensure that, in use, the electrolyte fills the channel to a consistent depth before overflowing.

3. A fuel cell stack as claimed in claim 1 wherein baffles are arranged within the electrolyte chamber to enhance flow uniformity.

4. A fuel cell stack as claimed in claim 3 wherein the electrolyte chamber comprises transverse notched baffles near the electrolyte inlets.

5. A fuel cell stack as claimed in claim 1 wherein an oxidant gas is supplied directly into each oxidant gas chamber through one or more entry channels which communicate with a face of the stack.

6. A fuel cell stack as claimed in claim 5 wherein that portion of the cell stack provided with the oxidant gas entry channels is enclosed within a plenum to which the oxidant gas is supplied at an elevated pressure.

* * * * *